United States Patent
Liu

(10) Patent No.: US 10,468,004 B2
(45) Date of Patent: Nov. 5, 2019

(54) INFORMATION PROCESSING METHOD, TERMINAL DEVICE AND COMPUTER STORAGE MEDIUM

(71) Applicant: TENCENT TECHNOLOGY (SHENZHEN) COMPANY LIMITED, Shenzhen, Guangdong (CN)

(72) Inventor: Pei Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 15/689,562

(22) Filed: Aug. 29, 2017

(65) Prior Publication Data
US 2018/0005618 A1   Jan. 4, 2018

Related U.S. Application Data

(63) Continuation of application No. PCT/CN2016/093287, filed on Aug. 4, 2016.

(30) Foreign Application Priority Data

Aug. 18, 2015 (CN) .......................... 2015 1 0508876

(51) Int. Cl.
*G10H 1/36* (2006.01)
*G10H 1/00* (2006.01)
*G06F 16/00* (2019.01)

(52) U.S. Cl.
CPC ............. *G10H 1/361* (2013.01); *G06F 16/00* (2019.01); *G10H 1/0008* (2013.01);
(Continued)

(58) Field of Classification Search
CPC ..................................................... G10H 1/361
(Continued)

(56) References Cited

U.S. PATENT DOCUMENTS 5,654,516 A   8/1997 Tashiro
5,859,380 A   1/1999 Anada
(Continued)

FOREIGN PATENT DOCUMENTS

CN   1604072 A   4/2005
CN   101042863 A   9/2007
(Continued)

OTHER PUBLICATIONS

International Search Report in international application No. PCT/CN2016/093287, dated Nov. 9, 2016.
(Continued)

*Primary Examiner* — David S Warren
(74) *Attorney, Agent, or Firm* — Oppedahl Patent Law Firm LLC

(57) ABSTRACT

A method for processing information, terminal device and a computer storage medium are disclosed. The method for processing information includes that: a first control instruction is acquired, and a first application is switched to a preset mode according to the first control instruction; a first triggering operation is acquired based on the preset mode, at least two pieces of multimedia data are selected based on the first triggering operation, and a first playing interface is generated; when a second control instruction is acquired, the at least two pieces of multimedia data in the first playing interface are sequentially played; in a process of playing first multimedia data in the at least two pieces of multimedia data, first audio data is acquired; and the first multimedia data and the first audio data are synthesized as second multimedia data.

19 Claims, 15 Drawing Sheets

(52) U.S. Cl.
CPC . *G10H 2210/005* (2013.01); *G10H 2220/011* (2013.01); *G10H 2220/096* (2013.01); *G10H 2220/106* (2013.01)

(58) Field of Classification Search
USPC .......................................................... 84/610
See application file for complete search history.

(56) References Cited

U.S. PATENT DOCUMENTS

| | | | |
|---|---|---|---|
| 2011/0281652 A1* | 11/2011 | Laverdiere | G06F 3/0219 463/37 |
| 2012/0311445 A1* | 12/2012 | Cabanilla | G11B 27/3027 715/716 |
| 2013/0070093 A1* | 3/2013 | Rivera | G11B 27/002 348/143 |
| 2014/0081797 A1* | 3/2014 | Rivera | G11B 27/002 705/26.5 |
| 2015/0148927 A1* | 5/2015 | Georges | G10H 1/0025 700/94 |
| 2015/0189397 A1* | 7/2015 | Rivera | G11B 27/002 725/80 |
| 2015/0193194 A1* | 7/2015 | Ahmed | G11B 27/10 700/94 |
| 2015/0227905 A1* | 8/2015 | Rivera | G11B 27/002 705/40 |
| 2016/0036962 A1* | 2/2016 | Rand | H04R 1/1041 455/418 |
| 2016/0269523 A1* | 9/2016 | Hardi | G06F 3/016 |
| 2017/0026509 A1* | 1/2017 | Rand | H04R 1/1041 |
| 2017/0223397 A1* | 8/2017 | Rivera | G11B 27/002 |
| 2018/0005618 A1* | 1/2018 | Liu | G10H 1/0008 |
| 2018/0124224 A9* | 5/2018 | Hardi | G06F 3/016 |
| 2018/0308462 A1* | 10/2018 | Wang | G10H 1/366 |
| 2018/0322482 A1* | 11/2018 | Rivera | G11B 27/002 |
| 2018/0338024 A1* | 11/2018 | Hardi | G06F 3/016 |

FOREIGN PATENT DOCUMENTS

| | | |
|---|---|---|
| CN | 101609666 A | 12/2009 |
| CN | 101808087 A | 8/2010 |
| CN | 102523521 A | 6/2012 |
| CN | 103390029 A | 11/2013 |
| CN | 204334883 U | 5/2015 |

OTHER PUBLICATIONS

Written Opinion of the International Search Authority in international application No. PCT/CN2016/093287, dated Nov. 9, 2016.
First Office Action of the Chinese application No. 201510508876.1, dated Jun. 3, 2019.

* cited by examiner

INFORMATION PROCESSING METHOD, TERMINAL DEVICE AND COMPUTER STORAGE MEDIUM

CROSS REFERENCE TO RELATED APPLICATIONS

This is a continuation application of International Patent Application No. PCT/CN2016/093287, filed on Aug. 4, 2016, which claims priority to Chinese Patent Application No. 201510508876.1 filed on Aug. 18, 2015, the disclosures of which are incorporated by reference herein in their entirety.

BACKGROUND

Along with development of network technology, there appear various kinds of song recording application software in terminals, and users may run the application software, select and play accompanying music of songs, follow the accompanying music and record their own voices through microphones of the terminals, thereby synthesizing the songs sung by themselves. At present, a song recording process of song recording application software is usually as follows: accompanying music of a song is selected at first for song singing and recording, if it is expected to continue recording songs, accompanying music of a next song is continued to be selected for song singing and recording, and such operations are repeated. Such a manner is too complicated in operation when multiple songs are required to be recorded.

SUMMARY

Embodiments of the disclosure provide a method for processing information, a terminal device and a computer storage medium, which may implement continuous recording of at least two songs and improve user experiences.

The embodiments of the disclosure provide a method for processing information, which includes that:

a first control instruction is acquired, and a first application is switched to a preset mode according to the first control instruction;

a first triggering operation is acquired based on the preset mode, at least two pieces of multimedia data are selected based on the first triggering operation, and a first playing interface is generated;

when a second control instruction is acquired, the at least two pieces of multimedia data in the first playing interface are sequentially played;

in a process of playing first multimedia data in the at least two pieces of multimedia data, first audio data is acquired, the first multimedia data being any multimedia data in the at least two pieces of multimedia data; and the first multimedia data and the first audio data are synthesized as second multimedia data.

The embodiments of the disclosure further provide a terminal device, which includes: a detection unit, a switching unit, a selection unit, a playing unit, an acquisition unit and a synthesis unit.

The detection unit may be configured to acquire a first control instruction, may also be configured to acquire a first triggering operation based on a preset mode, and may further be configured to acquire a second control instruction.

The switching unit may be configured to switch a first application to the preset mode according to the first control instruction detected by the detection unit.

The selection unit may be configured to select at least two pieces of multimedia data based on the first triggering operation acquired by the detection unit, and generate a first playing interface.

The playing unit may be configured to, when the detection unit acquires the second control instruction, sequentially play the at least two pieces of multimedia data in the first playing interface.

The acquisition unit may be configured to, in a process that the playing unit plays first multimedia data in the at least two pieces of multimedia data, acquire first audio data, the first multimedia data being any multimedia data in the at least two pieces of multimedia data.

The synthesis unit may be configured to synthesize the first multimedia data and the first audio data as second multimedia data.

The embodiments of the disclosure further provide a computer storage medium having computer-executable instructions stored therein, the computer-executable instructions being configured to execute the method for processing information according to the embodiments of the disclosure.

According to the method for processing information, the terminal device and the computer storage medium provided by the embodiments of the disclosure, the first control instruction is acquired, and the first application is switched to the preset mode according to the first control instruction; the first triggering operation is acquired based on the preset mode, the at least two pieces of multimedia data are selected based on the first triggering operation, and the first playing interface is generated; when the second control instruction is acquired, the at least two pieces of multimedia data in the first playing interface are sequentially played; in the process of playing the first multimedia data in the at least two pieces of multimedia data, the first audio data is acquired, the first audio data being any multimedia data in the at least two pieces of multimedia data; and the first multimedia data and the first audio data are synthesized as the second multimedia data. In such a manner, with the technical solutions of the embodiments of the disclosure, a continuous singing mode (i.e. the preset mode) is added to implement selection of at least two pieces of accompanying music (i.e. the at least two pieces of multimedia data) at one time and continuous song recording accompanied with the at least two pieces of accompanying music at one time, so that a user is prevented from repeatedly executing operations of selection, playing and the like after completing recording a song. Therefore, on one hand, operations of the user are reduced, and operation experiences of the user are improved. On the other hand, a requirement of the user on continuous recording of multiple songs is also met, and user experiences are greatly improved.

DETAILED DESCRIPTION

The disclosure will be further described below in detail with reference to the drawings and specific embodiments.

Figure 1:
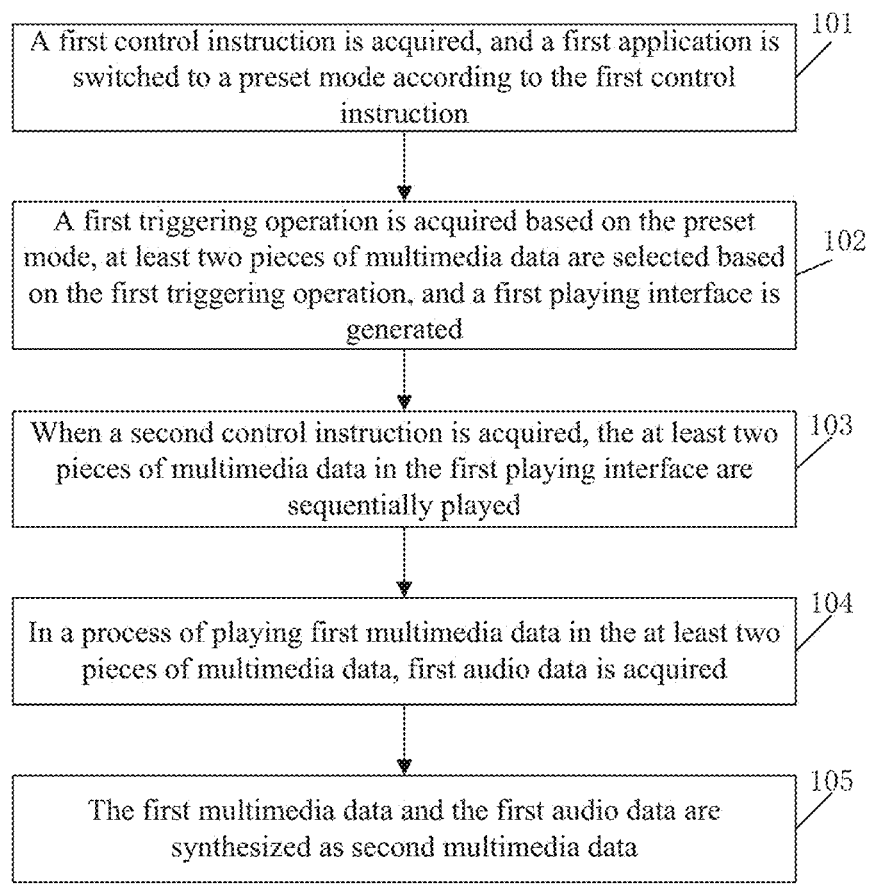
FIG. 1 is a flowchart of a method for processing information according to an embodiment of the disclosure.

An embodiment of the disclosure provides a method for processing information. FIG. 1 is a flowchart of a method for processing information according to an embodiment of the disclosure. As shown in FIG. 1, the method for processing information includes the following steps.

At Step 101, a first control instruction is acquired, and a first application is switched to a preset mode according to the first control instruction.

The method for processing information according to the embodiment of the disclosure is applied to a terminal device. The terminal device may be a mobile terminal such as an intelligent mobile phone, a wearable device and a tablet computer, and of course, may also be a fixed terminal such as a Personal Computer (PC) and an all-in-one computer. In the step, the operation that the first control instruction is detected and the first application is switched to the preset mode based on the first control instruction includes that: the terminal device detects the first control instruction, and switches the first application to the preset mode based on the first control instruction.

Here, the first application may run in the terminal device, and the first application has a function of simultaneously playing multimedia data and acquiring audio data and synthesizing the acquired audio data and the multimedia data after completing playing the multimedia data. As can be understood, the first application has a song recording function. That is, audio data sung by a user is acquired at the same time when multimedia data including accompanying audio data is played, and both of them are synthesized after singing, thereby obtaining a song sung by the user.

In the embodiment, the first application has the preset mode, the preset mode represents a continuous singing mode, and the continuous singing mode refers to a mode in which the user may select multiple pieces of multimedia data including accompanying audio data and the user may continuously sing and record multiple songs in a process of playing the multiple pieces of multimedia data including the accompanying audio data. In such a manner, a mode which supports recording of only one song in a conventional art is enriched, and the user is prevented from reselecting accompanying music and clicking a button representing "sing and record" for singing and recording of a next song after completing recording a song. In a scenario where the user is intended to record multiple songs, repeated operations are unfavorable for user experiences. In the embodiment, the preset mode avoids such repeated operations and improves operation experiences of the user.

As an implementation mode, the operation that the first control instruction is acquired includes that: a second triggering operation is acquired, and the first control instruction is generated based on the second triggering operation. Herein, the second triggering operation is for a preset region in a display interface of the first application. The second triggering operation is a triggering operation for a specific virtual button.

Specifically, in the embodiment, there is a virtual button in the display interface of the first application. When the second triggering operation for the virtual button is detected, the first control instruction is generated. Herein, the virtual button may be preconfigured at any position in the display interface. A display effect of the virtual button (the display effect includes, but not limited to: a size, a shape, a display material and a color) may be adaptively preconfigured according to a subject of the first application. For example, the first application may be preconfigured with multiple subject data packets and the user may run different subject data packets, thereby endowing the first application with different display effects to improve operation interestingness. In the embodiment, the second triggering operation is not limited to a triggering operation of a contact between an operator and a touch screen of the terminal device, and may also be a triggering operation of a suspended gesture at a distance which does not exceed a preset distance away from the touch screen of the terminal device.

As another implementation mode, the operation that the first control instruction is acquired includes that: voice input information is acquired; the voice input information is analyzed and recognized, and when the voice input information is determined to represent the first control instruction, it is determined that the first control instruction is acquired.

In the implementation mode, the first application supports a voice instruction control function. That is, all or a part of operations in the first application support voice control. Specifically, all or a part of voice instructions in the first application are preconfigured in the terminal device. When certain voice input information is acquired, the voice input information is analyzed, recognized and compared with the preconfigured voice instructions. The successfully matched voice instruction is executed. Herein, the successful matching refers to such a situation that the preconfigured voice instructions include the voice input information.

As still another implementation mode, the operation that the first control instruction is acquired includes that: a fourth triggering operation is acquired, the fourth triggering operation is compared with a preset operation gesture corresponding to the first control instruction, and the first control instruction is acquired in case of successful matching. The successful matching refers to such a situation that the fourth triggering operation is the same as the preset operation gesture. Herein, the fourth triggering operation is a triggering operation for any input region in the display interface of the first application in the terminal device.

In the implementation mode, operation gestures corresponding to all or a part of control instructions in the first application are preconfigured in the terminal device. For example, an operation gesture "◯" corresponds to the first control instruction; an operation gesture "A" corresponds to a playing and recording starting instruction; and operation gestures "↑" and "↓" correspond to volume up and volume down instructions, respectively. On such a basis, when the fourth triggering operation for any input region in the display interface of the first application in the terminal device is acquired, an operation gesture in the fourth triggering operation is recognized. The recognized operation gesture is compared with various preconfigured operation gestures. If the recognized operation gesture is determined to be successfully matched with the preconfigured operation gesture corresponding to the first control instruction, it is determined that the first control instruction is acquired.

At Step 102, a first triggering operation is acquired based on the preset mode, at least two pieces of multimedia data are selected based on the first triggering operation, and a first playing interface is generated.

In the preset mode, the user may select the at least two pieces of multimedia data to be sung and recorded through the first triggering operation, the at least two pieces of multimedia data are multimedia data including accompanying audio data, and the multimedia data may be audio data or video data. The video data may be pre-acquired Music Television (MTV) video data of songs, and may also be any video data pre-produced by the user. The video data includes the accompanying audio data of the songs, and the user may follow the accompanying audio data to sing.

The operation that the at least two pieces of multimedia data are selected based on the first triggering operation and the first playing interface is generated includes that:

multimedia data stored in the terminal device is selected based on the first triggering operation; and/or, multimedia data stored in network device is selected based on the first triggering operation; and the first playing interface including the at least two pieces of multimedia data is generated for the selected at least two pieces of multimedia data.

Specifically, after switching to the preset mode, the terminal device may be preconfigured to present a first selection interface, the first selection interface includes a multimedia data list stored in the terminal device, and audio data or video data which is stored in the terminal device and includes accompanying audio data is preferably selected. Of course, the first selection interface may further include a network access entry, and the user may trigger the network access entry to establish a network connection with the network device and acquire audio data or video data of accompanying music from the network device. The network access entry may specifically be a link address of a certain accompanying music website, and the network access entry is triggered to jump to a page of the accompanying music website. Alternatively, the network access entry may be a triggering entry of a certain accompanying music application installed in the terminal device, and the network access entry is triggered to run the accompanying music application. Of course, no matter which network multimedia data acquisition manner is adopted, only a name of the multimedia data selected by the user is presented in the first playing interface presented in the terminal device. After the multimedia data is selected or when the multimedia data is played, the terminal device is required to download the multimedia data, and play it only after downloading.

Of course, in the embodiment, the at least two pieces of multimedia data included in the first playing interface may be multimedia data partially stored in the terminal device and partially stored in the network device, and there are no specific limits made in the embodiment.

Herein, the at least two pieces of multimedia data in the first playing interface may be sequenced according to a preset sequencing rule. The preset sequencing rule includes, but not limited to: sequencing according to a sequence of initials of first words of the at least two pieces of multimedia data in the alphabet. For example, A is before B, C, D and the last is X, Y and Z. Alternatively, the preset sequencing rule includes, but not limited to: sequencing according to a selection sequence of the user. For example, if the user selects first accompanying music at first and then selects second accompanying music, then the first accompanying music is arranged before the second accompanying music.

At Step 103, when a second control instruction is acquired, the at least two pieces of multimedia data are sequentially played in the first playing interface. The operation that the at least two pieces of multimedia data in the first playing interface are sequentially played includes that:

when the multimedia data is stored in the terminal device, the multimedia data is directly played; and when the multimedia data is stored in the network device, the multimedia data is searched and downloaded based on a storage address of the multimedia data, and the multimedia data is played after being downloaded.

In the embodiment, since the at least two pieces of multimedia data selected by the user may be locally stored in the terminal device, and may also be stored in the network device, it is judged at first whether the played multimedia data is locally stored in the terminal device or not when the at least two pieces of multimedia data in the first playing interface are played. When it is determined that the multimedia data is locally stored in the terminal device, the multimedia data is directly played. When it is determined that the multimedia data is not locally stored in the terminal device, a network connection is established with the network device where the multimedia data is located according to the storage address (i.e. a network link address) of the multimedia data, the multimedia data is downloaded to the terminal device from the network device, and the multimedia data may be played only after being downloaded.

In the embodiment, similar to a detection manner for the first control instruction in Step 101, acquisition of the second control instruction may also be implemented through three implementation modes. Namely, acquisition of the second control instruction may be implemented in a virtual button triggering manner, through voice instruction control through a triggering operation for any input region of the terminal device, the triggering operation including the second control instruction. Referring to Step 101, an implementation manner for the second control instruction will not be specifically described in the embodiment.

In the embodiment, before the operation that the at least two pieces of data in the first playing interface are sequentially played, the method further includes that: at least two pieces of multimedia data stored in the terminal device or at least two pieces of multimedia data downloaded from the network device are added into a cache according to the selection sequence.

Specifically, when the second control instruction is detected, that is, a playing instruction is detected, for the acquired at least two pieces of multimedia data, no matter whether they are the multimedia data locally stored in the terminal device or the multimedia data downloaded from the network device, the acquired at least two pieces of multimedia data are added into the cache according to the selection sequence, so that the multimedia data may be conveniently read in sequence from the cache when the playing instruction is detected, and the at least two pieces of multimedia data are played according to the sequence.

At Step 104, in a process of playing first multimedia data in the at least two pieces of multimedia data, first audio data is acquired, the first multimedia data being any multimedia data in the at least two pieces of multimedia data.

In the step, when the first multimedia data in the first playing interface is played, a first instruction is generated, and the first instruction is executed to turn on audio input device (i.e. a microphone) of the terminal device to acquire the audio data through the audio input device. In the embodiment, the acquired first audio data is the audio data acquired through the audio input device in the process of playing the first multimedia data. The first audio data includes audio data sung without accompanying music by the user, and of course, further includes any audio data acquired by the audio input device.

At Step 105, the first multimedia data and the first audio data are synthesized as second multimedia data.

In the embodiment, the first multimedia data and the first audio data may be synthesized in a preconfigured synthesis manner.

As an implementation mode, a first time period is preconfigured. After each piece of multimedia data is played in the first playing interface, the played multimedia data and acquired audio data are synthesized in the first time period. That is, the next multimedia data is not played in the first time period, so that data synthesis time is reserved for the terminal device. When the first time period expires or after new multimedia data is synthesized, the next multimedia data is automatically played.

As another implementation mode, a virtual button is preconfigured in the first playing interface, the virtual button being configured to trigger the next multimedia data to be played. When a triggering operation for the virtual button is detected, no matter whether currently played multimedia data is completely played or not, the next multimedia data is immediately played. When the triggering operation for the virtual button is detected, as an implementation mode, if the currently played multimedia data is completely played, the currently played multimedia data and acquired audio data are automatically synthesized. Of course, prompting information may also be output, the prompting information including two triggering buttons representing execution of synthesis or non-execution of synthesis, and the user may select whether to select or delete a currently recorded song or not according to a triggering operation. As another implementation mode, if the currently played multimedia data has yet not been completely played, the currently played multimedia data and the acquired audio data are not synthesized as a default.

Furthermore, as an implementation mode, the method further includes that: a third triggering operation is acquired, and a sequence of the at least two pieces of multimedia data in the first playing interface is regulated to generate a second playing interface based on the third triggering operation; and the at least two pieces of multimedia data are played based on a playing sequence in the second playing interface.

Specifically, the sequence of the at least two pieces of multimedia data in the first playing interface may be regulated through the third triggering operation. The third triggering operation is, for example, a dragging triggering operation, that is, an operation object is pressed and moved. A time point for regulation may be any time after the first playing interface is generated in the embodiment. Of course, in a playing process of the multimedia data, a regulation range is only limited to the multimedia data which has yet not been played, that is, a sequence of the multimedia data which has yet not been played in the first playing interface may be regulated in the embodiment, for example, the fifth piece of multimedia data in the first playing interface is regulated to be the second, thereby generating the second playing interface.

With the technical solution of the embodiment of the disclosure, a continuous singing mode (i.e. the preset mode) is added to implement selection of at least two pieces of accompanying music (i.e. the at least two pieces of multimedia data) at one time and continuous song recording accompanied with the at least two pieces of accompanying music at one time, so that the user is prevented from repeatedly executing operations of selection, playing and the like after completing recording a song. Therefore, on one hand, operations of the user are reduced, and operation experiences of the user are improved. On the other hand, a requirement of the user on continuous recording of multiple songs is also met, and user experiences are greatly improved.

The embodiment of the disclosure further provides a computer storage medium having computer-executable instructions stored therein, the computer-executable instructions being configured to execute the method for processing information according to the embodiment of the disclosure.

Figure 2:
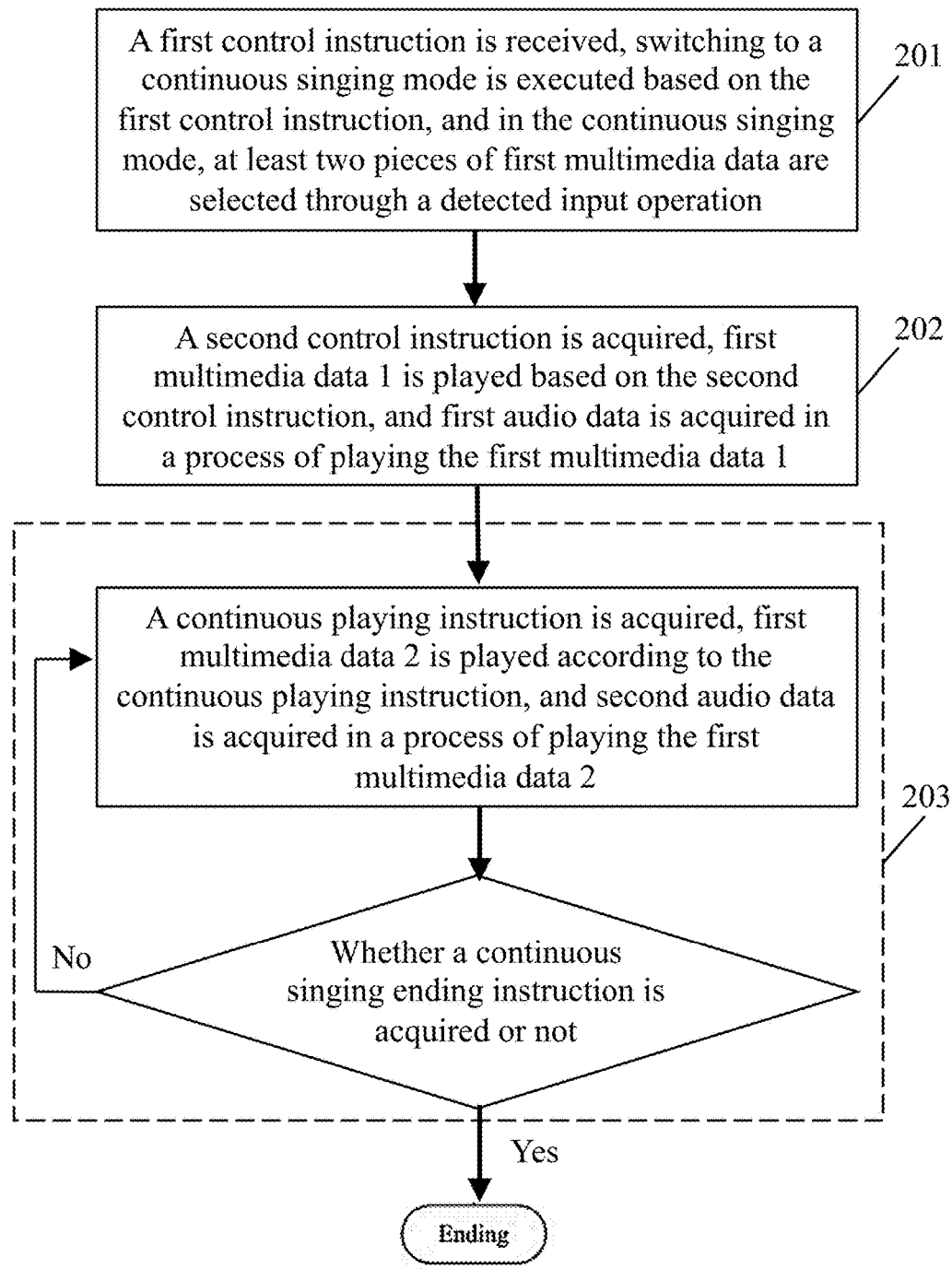
FIG. 2 is a flowchart of a method for processing information according to another embodiment of the disclosure.

An embodiment of the disclosure further provides a method for processing information. FIG. 2 is a flowchart of a method for processing information according to another embodiment of the disclosure. As shown in FIG. 2, the method for processing information includes the following steps.

At Step 201, a first control instruction is received, switching to a continuous singing mode is executed based on the first control instruction, in which at least two pieces of first multimedia data are selected through a detected input operation.

Herein, a terminal device receives the first control instruction in a scenario where a first application is activated. The first control instruction is configured to switch the first application to the continuous singing mode. In the continuous singing mode, a terminal may select multiple pieces of first multimedia data including accompanying audio data through the detected input operation (such as a touch control operation of a mobile terminal or a mouse input operation of a fixed terminal). In the embodiment, the first application has a function of simultaneously playing first multimedia data and acquiring audio data and synthesizing the acquired audio data and the first multimedia data after completing playing the first multimedia data. It may be understood that the first application has a song recording function. That is, audio data sung by a user is acquired at the same time when first multimedia data including accompanying audio data is played, and both of them are synthesized after singing, thereby obtaining a song sung by the user.

On such a basis, when the first application is in the continuous singing mode, the user may select the at least two pieces of first multimedia data to be sung and recorded through the input operation, and a first playing interface is generated. The at least two pieces of first multimedia data are multimedia data including accompanying audio data, and the first multimedia data may be audio data or video data.

At Step 202, a second control instruction is acquired, first multimedia data 1 is played based on the second control instruction, and first audio data is acquired in a process of playing the first multimedia data 1, wherein the first multimedia data 1 is any one of the selected at least two pieces of first multimedia data.

In the embodiment, the terminal device acquires the first audio data when playing the first multimedia data 1, that is, audio data sung by the user is acquired when accompanying audio data is played. Specifically, after the first multimedia data 1 is played, the first multimedia data 1 and the acquired first audio data are synthesized as audio data according to a timeline, and the synthesized audio data may be recorded as second multimedia data. It may be understood that in the embodiment, after the user records a song, the terminal device reserves a period of time for synthesis of the accompanying audio data and the audio data sung by the user. After audio synthesis is completed, Step 203 is executed.

At Step 203, a continuous playing instruction is acquired, first multimedia data 2 is played according to the continuous playing instruction, second audio data is acquired in a process of playing the first multimedia data 2, and the step is cyclically executed until a continuous singing ending instruction is acquired. The first multimedia data 2 is any one of the first multimedia data which has yet not been played in the selected at least two pieces of first multimedia data.

In an embodiment of the disclosure, a specific step for acquisition of the continuous playing instruction is as follows: it is detected whether a first time length reaches a first preset time length or not, and the continuous playing instruction is generated when the first time length reaches the first preset time length. Herein, the first time length is a time length calculated from a playing ending time of first multimedia data n (n is a positive integer). The first preset time length is a preconfigured time interval between every two pieces of adjacently played first multimedia data in the selected at least two pieces of first multimedia data, i.e. a time interval between every two pieces of adjacently played first multimedia data in the selected at least two pieces of first multimedia data in a preset continuous singing mode. For example, if first multimedia data A and first multimedia data B in the selected at least two pieces of first multimedia data are two pieces of adjacently played first multimedia data in the continuous singing mode, the first multimedia data B will wait a first preset time length after playing the first multimedia data A is completed and then be automatically started to be played without any instruction or operation input by the user.

In another embodiment of the disclosure, a specific step for acquisition of the continuous playing instruction is as follows: the continuous playing instruction input by the user after the first multimedia data n (n is a positive integer) is started to be played and before first multimedia data (n+1) is started to be played is detected. Herein, a manner for the user to input the continuous playing instruction includes, but not limited to, a voice, a virtual button, a gesture or the like.

In an embodiment of the disclosure, acquisition of the continuous singing ending instruction specifically includes that: the continuous singing ending instruction is generated when it is detected that the selected at least two pieces of first multimedia data are all completely played.

In another embodiment of the disclosure, acquisition of the continuous singing ending instruction specifically includes that: the continuous singing ending instruction input by the user is detected. Herein, a manner for the user to input the continuous singing ending instruction includes, but not limited to, a voice, a virtual button, a gesture or the like.

In another embodiment of the disclosure, at the end of playing of the first multimedia data 1, the first multimedia data 1 and the first audio data are synthesized as second multimedia data 1. Specifically, the first multimedia data 1 and the first audio data may be synthesized as the second multimedia data 1 within a first preset time length from the end of playing of the first multimedia data 1 to the start of playing of the first multimedia data 2.

At the end of playing of the first multimedia data 2, the first multimedia data 2 and the second audio data are synthesized as second multimedia data 2. Specifically, the first multimedia data 2 and the second audio data may be synthesized as the second multimedia data 2 within the first preset time length from the end of playing of the first multimedia data 2.

In another embodiment of the disclosure, the method further includes that: when the continuous playing instruction input after the first multimedia data n (n is a positive integer) is started to be played and before the first multimedia data (n+1) is started to be played is detected, first multimedia data n and nth audio data are synthesized as second multimedia data n.

Figure 3:
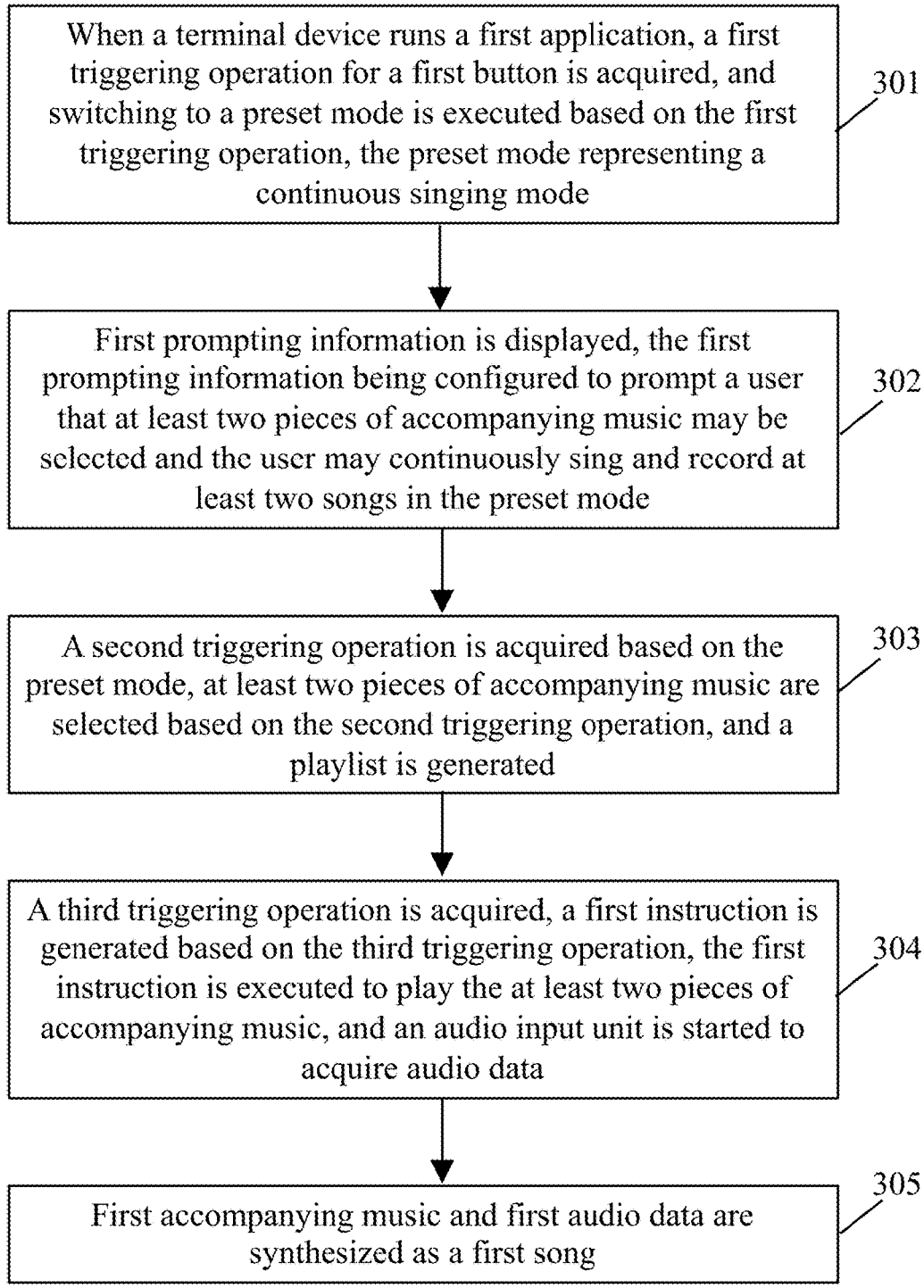
FIG. 3 is a flowchart of a method for processing information according to still another embodiment of the disclosure.

An embodiment of the disclosure further provides a method for processing information. The method for processing information according to the embodiment is described in detail with a specific example. FIG. 3 is a flowchart of a method for processing information according to still another embodiment of the disclosure. In the embodiment, multimedia data specifically refers to audio data, and is called as companying music in the embodiment. As shown in FIG. 3, the method for processing information includes the following steps.

At Step 301, when a terminal device runs a first application, a first triggering operation for a first button is acquired, and switching to a preset mode is executed based on the first triggering operation, the preset mode representing a continuous singing mode.

Here, the first application has a function of simultaneously playing multimedia data and acquiring audio data and synthesizing the acquired audio data and the multimedia data after completing playing the multimedia data. It may be understood that the first application has a song recording function. That is, audio data sung by a user is acquired at the same time when accompanying audio data (which may also be video data) is played, and both of them are synthesized after singing, thereby obtaining a song sung by the user.

In the embodiment, the first application has the preset mode, the preset mode presents the continuous singing mode, and the continuous singing mode may be understood as a mode in which the user may preselect multiple pieces of accompanying data (i.e. the multimedia data) and the user may continuously sing and record multiple songs in a process of playing the multiple pieces of accompanying data.

Figure 4A:
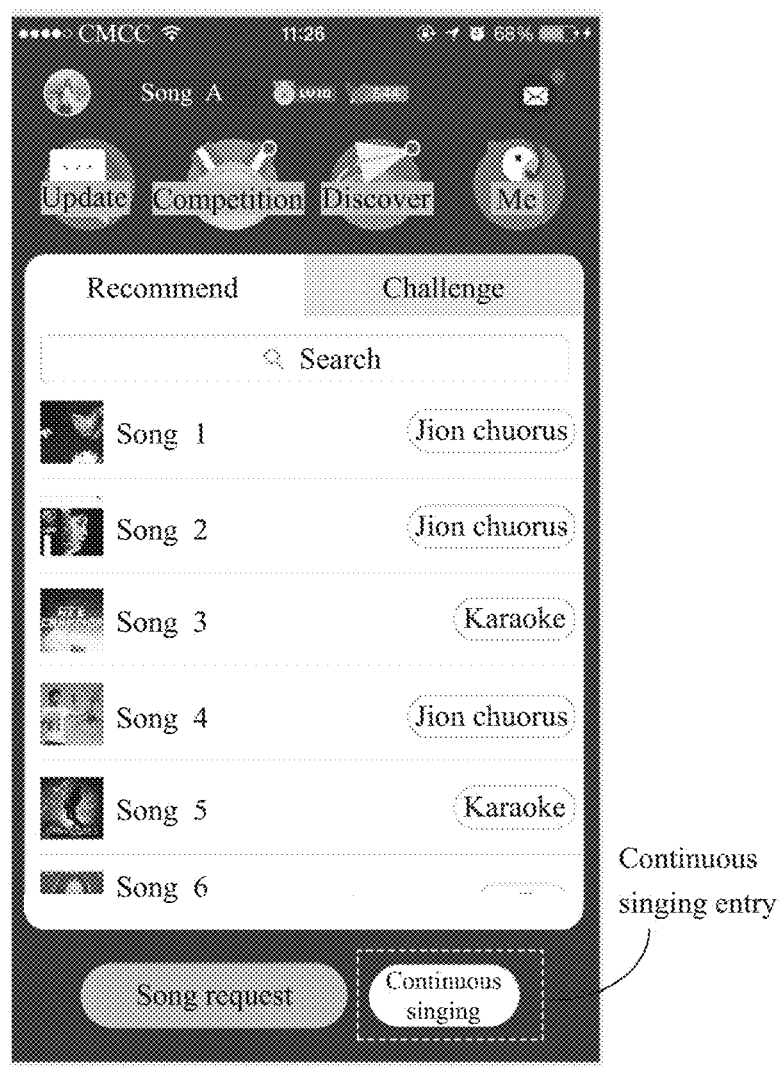
FIG. 4A to FIG. 4J are respective schematic diagrams of application scenarios of a method for processing information according to an embodiment of the disclosure.

FIG. 4A is a schematic diagram of an application scenario of a method for processing information according to an embodiment of the disclosure. As shown in FIG. 4A, a display interface presented by the first application includes two modes. A first mode may refer to a "Song request" button shown in FIG. 4A. The "Song request" button may be triggered to enter a single song recording mode. In the single song recording mode, the user selects a piece of accompanying music and records a song. A second mode refers to a "Continuous singing" button shown in FIG. 4A. The "Continuous singing" button may be triggered for switching to the continuous singing mode in the step. In the continuous singing mode, the user may select at least two pieces of accompanying music, and the user may continuously sing and record multiple songs in a process of playing the at least two pieces of accompanying music.

Furthermore, after the first application enters the preset mode, if it is the first time for the first application to enter the preset mode, Step 302 is executed. If it is not the first time for the first application to enter the preset mode, Step 303 is directly executed.

Figure 4B:
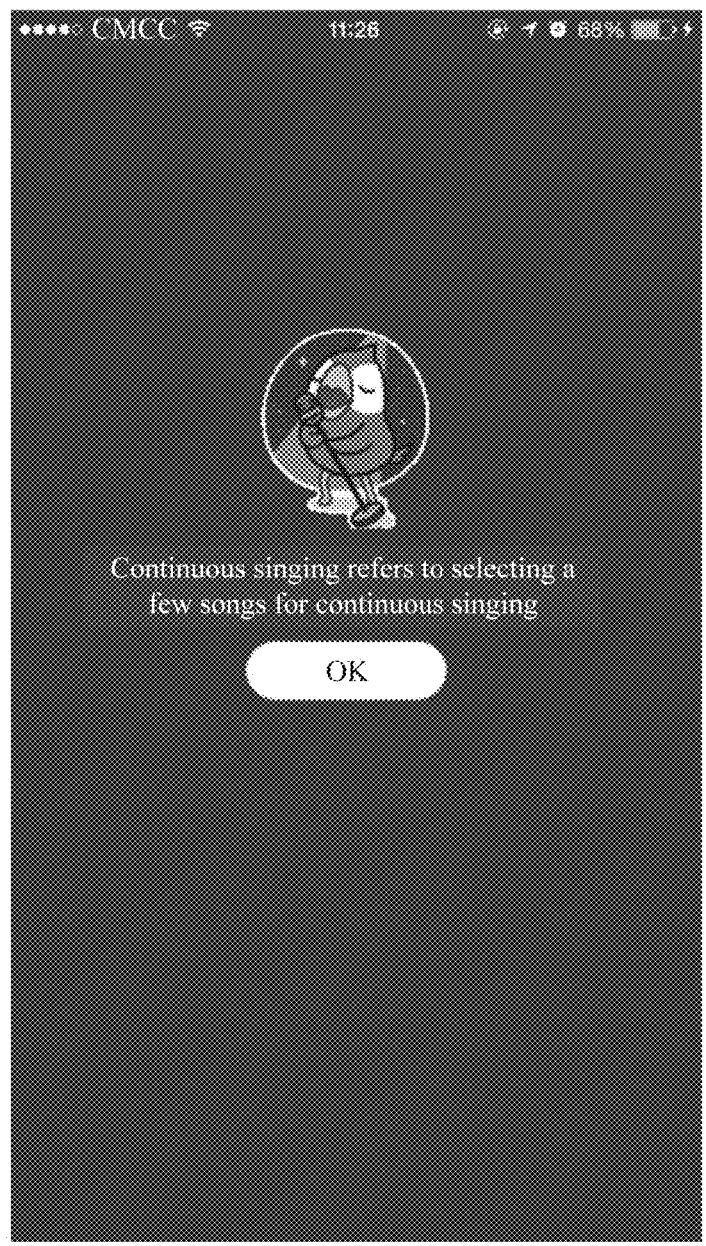

At Step 302, first prompting information is displayed, the first prompting information being configured to prompt a user that at least two pieces of accompanying music may be selected and the user may continuously sing and record at least two songs in the preset mode. It may be understood that the first prompting information is guide information of the preset mode so as to enable the user to more clearly understand a function of the preset mode. FIG. 4B is a schematic diagram of another application scenario of a method for processing information according to an embodiment of the disclosure. The first prompting information in the step may specifically refer to FIG. 4B. Step 303 is further executed.

At Step 303, a second triggering operation is acquired based on the preset mode, at least two pieces of accompanying music are selected based on the second triggering operation, and a playlist is generated.

Figure 4C:
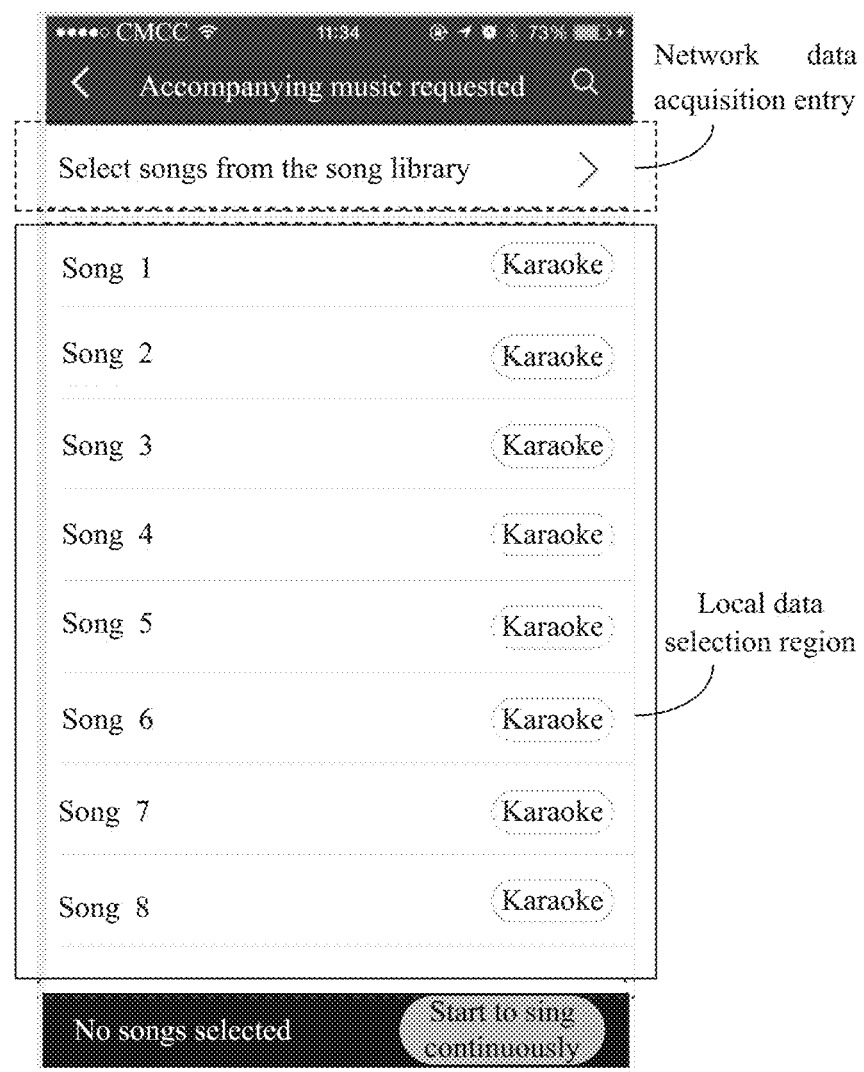
Figure 4D:
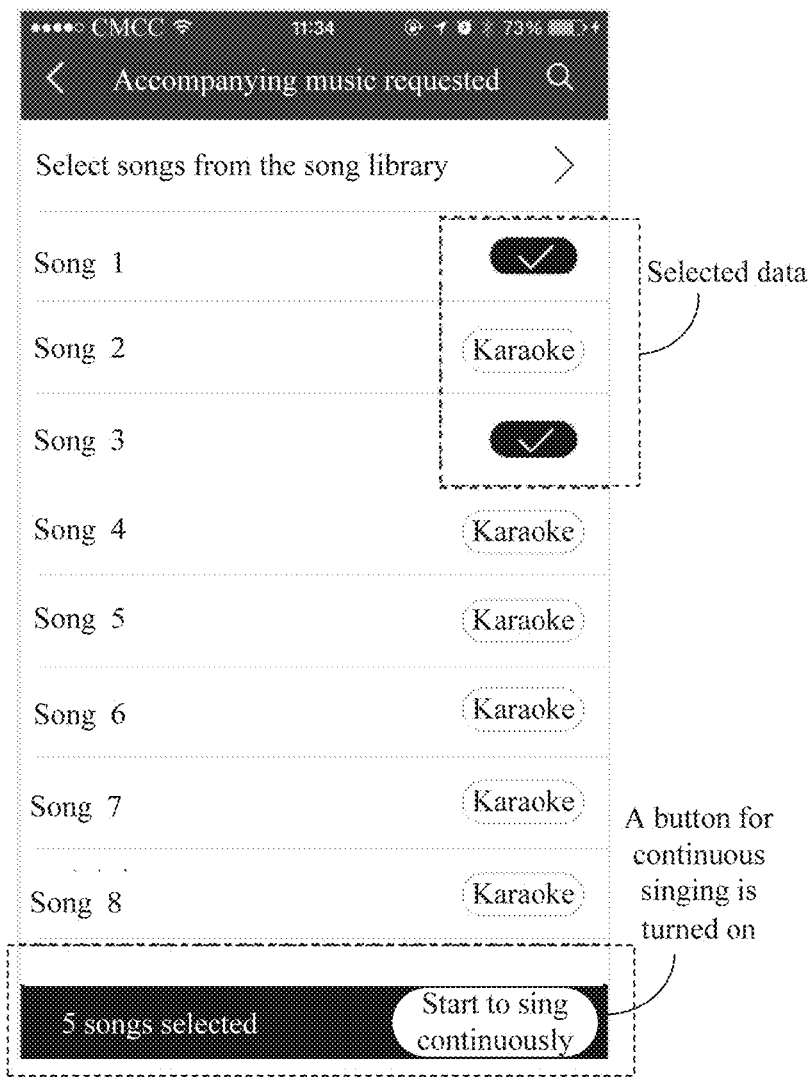

FIG. 4C and FIG. 4D are schematic diagrams of another application scenario of a method for processing information according to an embodiment of the disclosure. As shown in FIG. 4C, in the step, after switching to the preset mode, a display interface shown in FIG. 4C is presented, and accompanying music locally stored in the terminal device and a network data acquisition entry are displayed in the display interface as a default. The user may select accompanying music to be recorded in a local data selection region. When any one piece of accompanying music is to be triggered, a region where the accompanying music is located is different from a region where unselected accompanying music is located. Specifically as shown in FIG. 4D, after certain accompanying music is selected, a check box of a region where it is located is selected to indicate that the corresponding accompanying music has been selected. Furthermore, the display interface may further include a selected display region. As shown in FIG. 4C, when any piece of accompanying music is not selected, "No songs selected" is displayed. At this moment, because no accompanying music is selected, a "Start to sing continuously" button is displayed to be grey so as to indicate that no operation is allowed. When at least one piece of accompanying music is selected, as shown in FIG. 4D, "5 songs selected" is displayed, and the "Start to sing continuously" button is in an on state, which indicates that an operation is allowed.

Figure 4E:
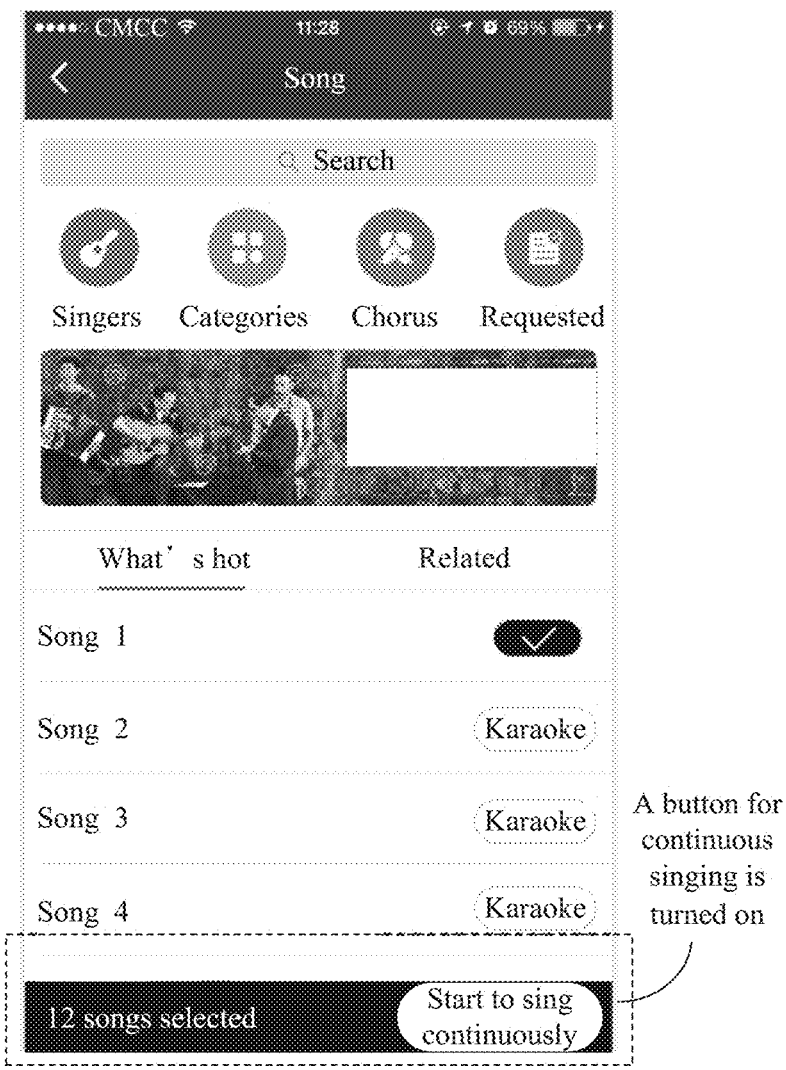

Furthermore, when no accompanying music of a song that the user is intended to record is locally stored in the terminal device, the accompanying music data network side may be acquired through a network data acquisition entry, such as a "Select songs from the song library" region shown in FIG. 4C or FIG. 4D. The user triggers the network data acquisition entry to jump to a preconfigured accompanying music website page or a display interface of an accompanying music application. FIG. 4E is a schematic diagram of still another application scenario of a method for processing information according to an embodiment of the disclosure. As shown in FIG. 4E, the preconfigured display interface of the accompanying music application is displayed in the diagram. In the display interface, at least two pieces of accompanying music may be selected. After at least one piece of accompanying music is selected, "12 songs selected" is displayed in FIG. 4E, and the "Start to sing continuously" button is in the on state, which indicates that an operation is allowed.

At Step 304, a third triggering operation is acquired, a first instruction is generated based on the third triggering operation, the first instruction is executed to play the at least two pieces of accompanying music, and an audio input unit is started to acquire audio data.

As shown in FIG. 4D or FIG. 4E, the third triggering operation is a triggering operation for a "Start to sing continuously" button, and the first instruction is generated to play the selected at least two pieces of accompanying music. Meanwhile, the audio input unit (i.e. a microphone) of the terminal device is started for audio acquisition and recording of voices sung by the user without accompanying music.

Figure 4F:
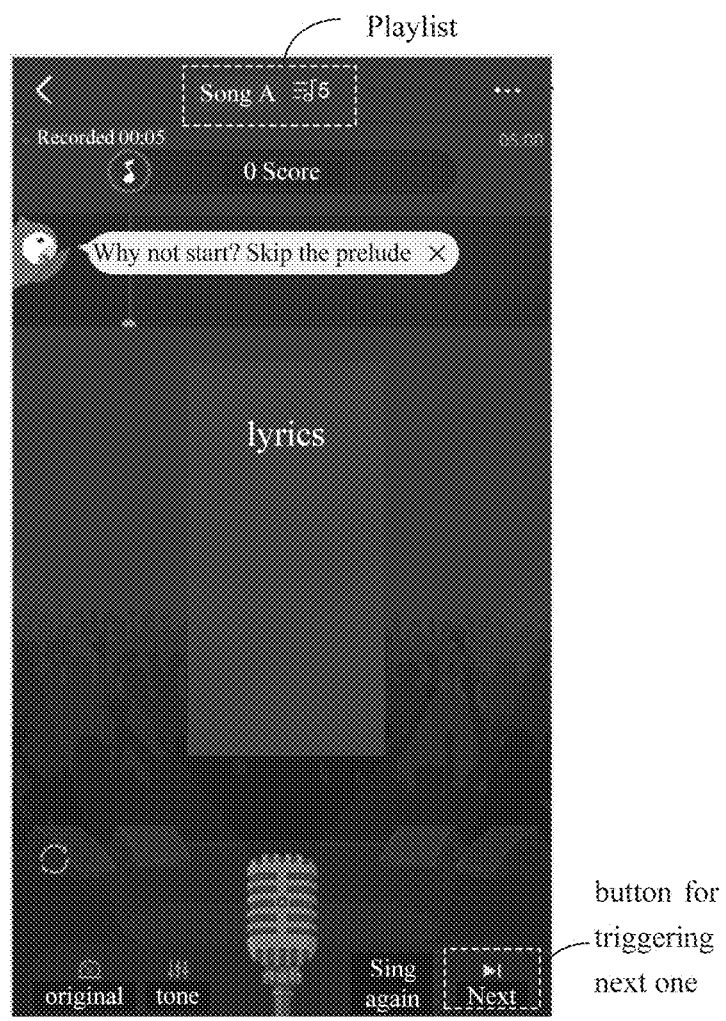
Figure 4G:
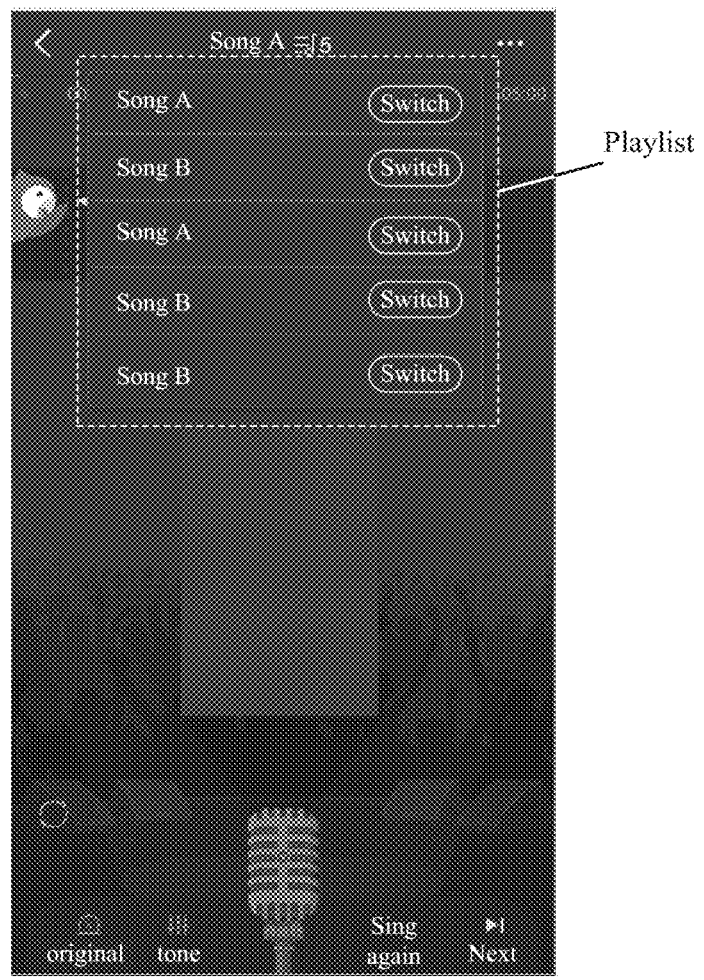
Figure 4H:
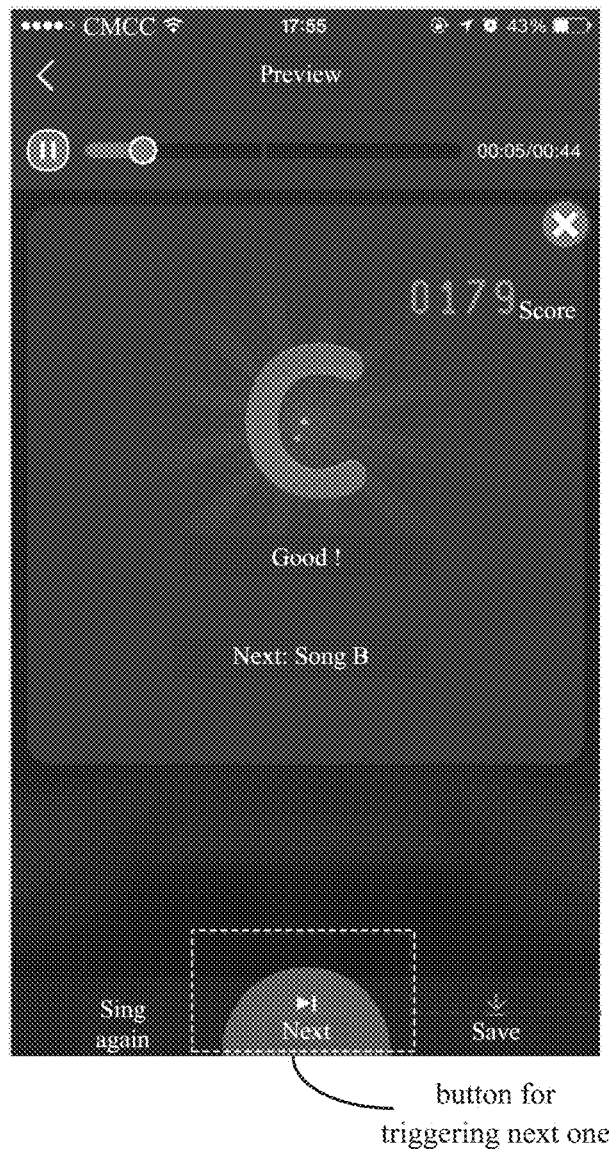

As an implementation mode, FIG. 4F and FIG. 4H are schematic diagrams of yet another application scenario of a method for processing information according to an embodiment of the disclosure. As shown in FIG. 4F, in a playing process of any piece of accompanying music, lyrics of a song corresponding to the accompanying music are displayed on the display interface of the terminal device for the user to sing with reference to the lyrics in a singing process, so that user experiences are greatly improved. On the other hand, the playlist including the at least two pieces of accompanying music may be partially displayed on the display interface. For example, as shown in FIG. 4F, only a name of the currently played accompanying music is displayed and names of the other accompanying music are hidden. When a triggering operation for a region where the playlist is located is detected, the whole playlist is displayed. As shown in FIG. 4G, the playlist may be displayed in a suspension manner through a suspension layer. In the playlist, a sequence of the accompanying music in the playlist may be regulated through a triggering operation. As shown in FIG. 4G, when a "preferred" button corresponding to any piece of accompanying music is triggered, the accompanying music corresponding to the "preferred" button is regulated to be displayed at the top. As shown in FIG. 4G, the currently played accompanying music is "Father" of Chopsticks Brothers, and after a "preferred" button corresponding to accompanying music of "Model" of Li Ronghao is triggered, a position where the accompanying music of "Model" is located is regulated to just follow the currently played accompanying music of "Father". Therefore, a playing sequence of the accompanying music in the playlist may be regulated according to own preference of the user, and the user experiences are greatly improved.

Furthermore, the display interface further includes a button for triggering next one. As shown in FIG. 4F or FIG. 4H, the button for triggering next one in FIG. 4F may be triggered to directly play the next accompanying music no matter whether the currently played accompanying music is completely played or not. Of course, in a scenario shown in FIG. 4H, after the currently played accompanying music has been played to end, the user is not required to trigger the button for triggering next one and the next accompanying music is directly played.

At Step 305, the first accompanying music and first audio data are synthesized as a first song. The first accompanying music is any piece of accompanying music in the playlist, and the first audio data is audio data, acquired by the audio input unit, accompanied by the first accompanying music. Thus, it may be understood that the first song is a song sung by the user accompanied by the first accompanying music.

In the embodiment, the first accompanying music and the first audio data may be synthesized in a preconfigured synthesis manner. The preconfigured synthesis manner may select any data synthesis manner in the conventional art, and will not be specifically limited in the embodiment.

As an implementation mode, a first time period may be preconfigured. After each piece of accompanying music is played to end, the played first accompanying music and the acquired first audio data are synthesized in the first time period. That is, the next accompanying music is not played in the first time period, so that data synthesis time is reserved for the terminal device. When the first time period expires or after a new song is synthesized, the next accompanying music is automatically played.

Figure 4I:
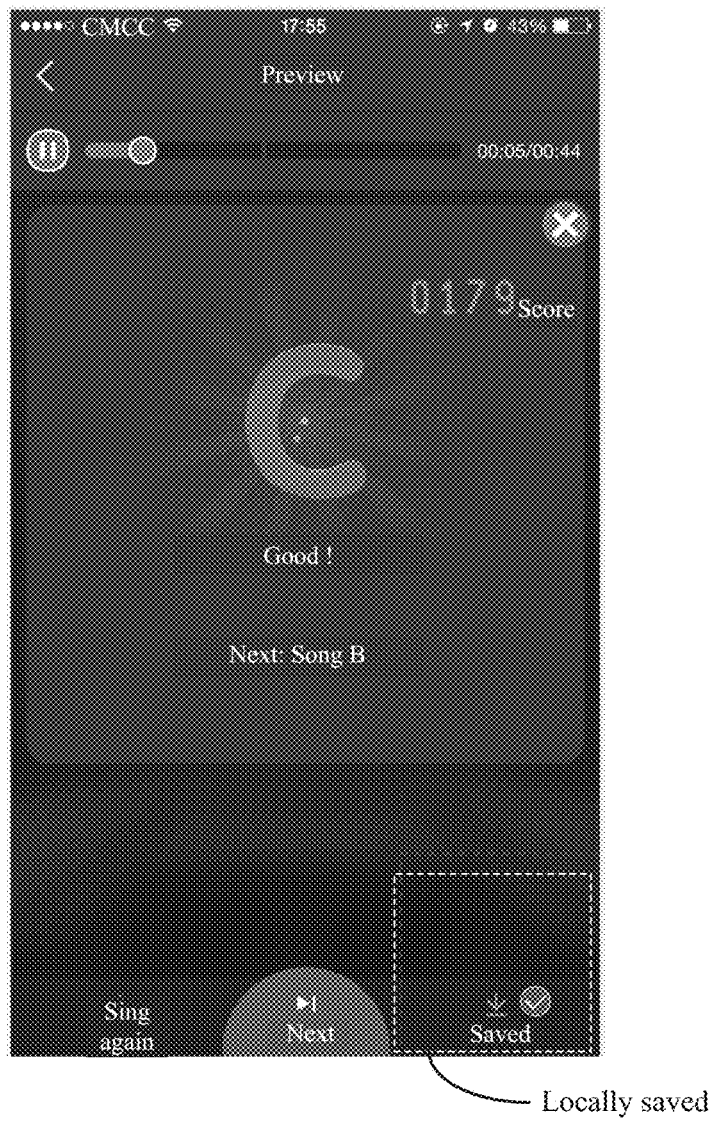

FIG. 4I is a schematic diagram of another application scenario of a method for processing information according to an embodiment of the disclosure. As shown in FIG. 4I, the synthesized song is locally stored in the terminal device, and a recorded song list which has currently been stored is presented through a triggering operation for a "Save" button.

Figure 4J:
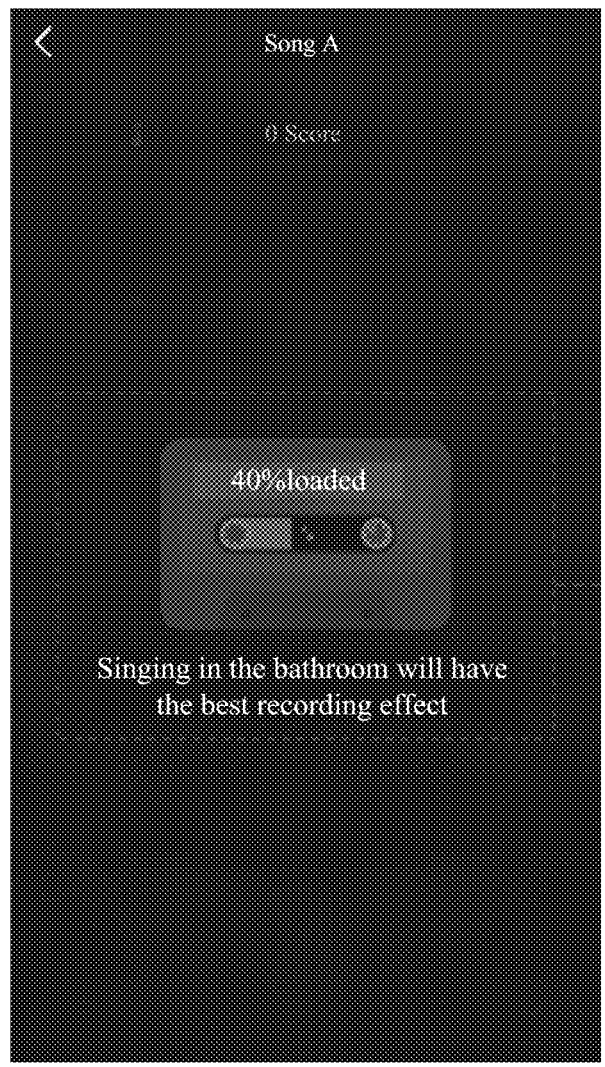

As another implementation mode, when the played accompanying music is not locally stored in the terminal device but required to be acquired from the network side, a connection is established with network device through an address link of the accompanying music, and the accompanying music is downloaded. That is, before the accompanying music is played, the accompanying music is downloaded. FIG. 4J is a schematic diagram of another application scenario of a method for processing information according to an embodiment of the disclosure. The implementation mode may specifically be shown in FIG. 4J.

With the technical solution of the embodiment of the disclosure, a continuous singing mode (i.e. the preset mode) is added to implement selection of at least two pieces of accompanying music (i.e. the at least two pieces of multimedia data) at one time and continuous song recording accompanied with the at least two pieces of accompanying music at one time, so that the user is prevented from repeatedly executing operations of selection, playing and the like after completing recording a song. Therefore, on one hand, operations of the user are reduced, and operation experiences of the user are improved. On the other hand, a requirement of the user on continuous recording of multiple songs is also met, and user experiences are greatly improved.

The embodiment of the disclosure further provides a computer storage medium having computer-executable instructions stored therein, the computer-executable instructions being configured to execute the method for processing information of the embodiment of the disclosure.

Figure 5:
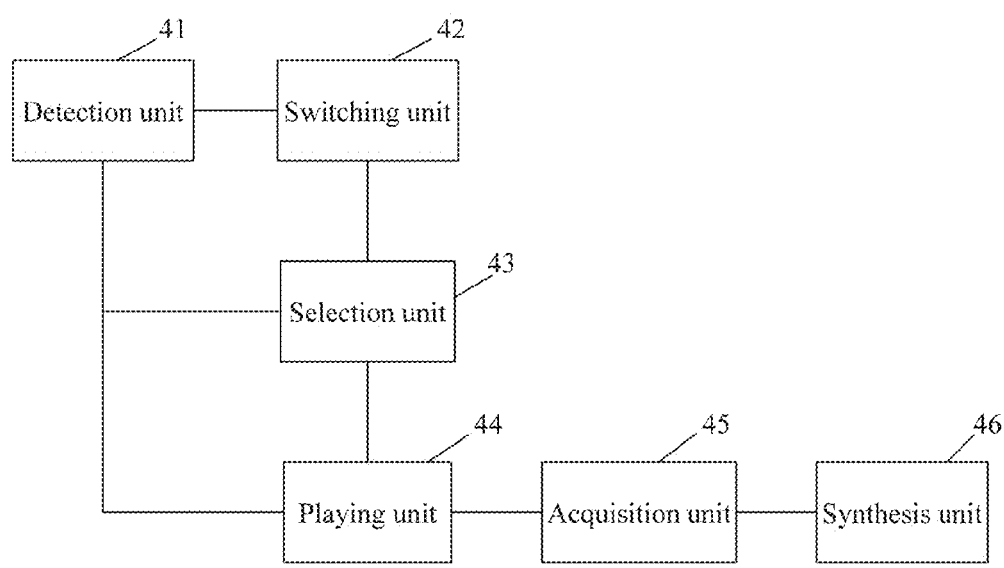
FIG. 5 is a structure diagram of a terminal device according to an embodiment of the disclosure.

The embodiment of the disclosure further provides a terminal device. FIG. 5 is a structure diagram of a terminal device according to an embodiment of the disclosure. As shown in FIG. 5, the terminal device includes: a detection unit 41, a switching unit 42, a selection unit 43, a playing unit 44, an acquisition unit 45 and a synthesis unit 46.

The detection unit 41 is configured to acquire a first control instruction, is also configured to acquire a first triggering operation based on the preset mode, and is further configured to acquire a second control instruction.

The switching unit 42 is configured to switch a first application to a preset mode according to the first control instruction detected by the detection unit 41, the preset mode representing a continuous singing mode.

The selection unit 43 is configured to select at least two pieces of multimedia data based on the first triggering operation acquired by the detection unit 41, and generate a first playing interface.

The playing unit 44 is configured to, when the detection unit acquires the second control instruction, sequentially play the at least two pieces of multimedia data in the first playing interface.

The acquisition unit 45 is configured to, in a process that the playing unit 44 plays first multimedia data in the at least two pieces of multimedia data, acquire first audio data, the first multimedia data being any multimedia data in the at least two pieces of multimedia data.

The synthesis unit 46 is configured to synthesize the first multimedia data and the first audio data as second multimedia data.

In the embodiment, the first application may run in terminal device, and the first application has a function of simultaneously playing multimedia data and acquiring audio data and synthesizing the acquired audio data and the multimedia data after completing playing the multimedia data. It may be understood that the first application has a song recording function. That is, audio data sung by a user is acquired at the same time when multimedia data including accompanying audio data is played, and both of them are synthesized after singing, thereby obtaining a song sung by the user.

In the embodiment, the first application has the preset mode and the preset mode represents a continuous singing mode. The continuous singing mode refers to a mode in which the user may select multiple pieces of multimedia data including accompanying audio data and the user may continuously sing and record multiple songs in a process of playing the multiple pieces of multimedia data including the accompanying audio data. In such a manner, a mode which supports recording of only one song in a conventional art is enriched, and the user is prevented from reselecting accompanying music and clicking a button representing "sing and record" for singing and recording of a next song after completing recording a song. In a scenario where the user is intended to record multiple songs, repeated operations are unfavorable for user experiences. In the embodiment, the preset mode avoids such repeated operations and improves operation experiences of the user.

As a first implementation mode, the detection unit 41 is configured to acquire a second triggering operation, and generate the first control instruction based on the second triggering operation. The second triggering operation is for a preset region in a display interface of the first application. The second triggering operation is a triggering operation for a specific virtual button.

Specifically, there is a virtual button in the display interface of the first application. When the detection unit 41 detects the second triggering operation for the virtual button, the first control instruction is generated. The virtual button may be preconfigured at any position in the display interface. A display effect of the virtual button (the display effect includes, but not limited to: a size, a shape, a display material and a color) may be adaptively preconfigured according to a subject of the first application. For example, the first application may be preconfigured with multiple subject data packets. The user may run different subject data packets, thereby endowing the first application with different display effects to improve operation interestingness. In the implementation mode, the second triggering operation is not limited to a triggering operation of a contact between an operator and a touch screen of the terminal device, and may also be a triggering operation of a suspended gesture at a distance which does not exceed a preset distance away from the touch screen of the terminal device.

As a second implementation mode, the detection unit 41 is configured to acquire voice input information, analyze and recognize the voice input information, and when the voice input information is determined to represent the first control instruction, determine that the first control instruction is acquired.

In the implementation mode, the first application supports a voice instruction control function, that is, all or a part of operations in the first application support voice control. Specifically, all or a part of voice instructions in the first application are preconfigured in the terminal device. When the detection unit 41 detects certain voice input information, the voice input information is analyzed, recognized and compared with all or a part of the preconfigured voice instructions. The successfully matched voice instruction is executed.

As a third implementation mode, the detection unit 41 is configured to acquire a fourth triggering operation, compared the fourth triggering operation with a preset operation gesture corresponding to the first control instruction, and acquire the first control instruction in case of successful matching. Herein, the fourth triggering operation is a triggering operation for any input region in the display interface of the first application in the terminal device.

In the implementation mode, operation gestures corresponding to all or a part of control instructions in the first application are preconfigured in the terminal device. For example, an operation gesture "○" corresponds to the first control instruction; an operation gesture "Δ" corresponds to a playing and recording starting instruction; and operation gestures "↑" and "↓" correspond to a volume up and volume down instructions, respectively. On such a basis, when the detection unit 41 acquires the fourth triggering operation for any input region in the display interface of the first application in the terminal device, an operation gesture in the fourth triggering operation is recognized. The recognized operation gesture is compared with various preconfigured operation gestures. If the recognized operation gesture is determined to be successfully matched with the preconfigured operation gesture corresponding to the first control instruction, it is determined that the first control instruction is acquired.

In the embodiment, in the preset mode, the user may select the at least two pieces of multimedia data to be sung and recorded through the first triggering operation detected by the detection unit 41, the at least two pieces of multimedia data are multimedia data including accompanying audio data, and the multimedia data may be audio data or video data. The video data may be pre-acquired MTV video data of songs, and may also be any video data pre-produced by the user. The video data includes the accompanying audio data of the songs, and the user may follow the accompanying audio data to sing.

Specifically, the selection unit 43 is configured to select multimedia data stored in the terminal device based on the first triggering operation; and/or, select multimedia data stored in network device based on the first triggering operation; and generate the first playing interface including the at least two pieces of multimedia data for the selected at least two pieces of multimedia data.

Furthermore, the playing unit 44 is configured to, when the multimedia data is stored in the terminal device, directly play the multimedia data; and when the multimedia data is stored in the network device, search and download the multimedia data based on a storage address of the multimedia data, and play the multimedia data after completing downloading.

Specifically, after switching to the preset mode by the switching unit 42, the terminal device may be preconfigured to present a first selection interface, the first selection interface includes a multimedia data list stored in the terminal device, and audio data or video data which is stored in the terminal device and includes accompanying audio data is preferably selected through the selection unit 43. Of course, the first selection interface may further include a network access entry, and the user may trigger the network access entry to establish a network connection with the network device and acquire audio data or video data of accompanying music from the network device. The network access entry may specifically be a link address of a certain accompanying music website, and the network access entry is triggered to jump to a page of the accompanying music website. Alternatively, the network access entry may be a triggering entry of a certain accompanying music application installed in the terminal device, and the network access entry is triggered to run the accompanying music application. Of course, no matter which network multimedia data acquisition manner is adopted, only a name of the multimedia data selected by the user is presented in the first playing interface presented in the terminal device. After the multimedia data is selected or when the multimedia data is played, the terminal device is required to download the multimedia data, and may play it only after downloading.

In the embodiment, the playing unit 44 is configured to, before the at least two pieces of multimedia data in the first playing interface are sequentially played, add at least two pieces of multimedia data stored in the terminal device or at least two pieces of multimedia data downloaded from the network device into a cache according to a selection sequence.

Specifically, when the playing unit 44 detects the second control instruction, that is, a playing instruction, for the acquired at least two pieces of multimedia data, no matter whether they are the multimedia data locally stored in the terminal device or the multimedia data downloaded from the network device, the acquired at least two pieces of multimedia data are added into the cache according to the selection sequence, so that the multimedia data may be conveniently read in sequence from the cache when the playing instruction is detected, and the at least two pieces of multimedia data are played according to the sequence.

Of course, in the embodiment, the at least two pieces of multimedia data included in the first playing interface may be multimedia data partially stored in the terminal device and partially stored in the network device, and there are no specific limits made in the embodiment.

As an implementation mode, the at least two pieces of multimedia data in the first playing interface may be sequenced according to a preset sequencing rule. The preset sequencing rule includes, but not limited to: sequencing according to a sequence of initials of first words of the at least two pieces of multimedia data in the alphabet. For example, A is before B, C, D and the last is X, Y and Z. Alternatively, the preset sequencing rule includes, but not limited to: sequencing according to the selection sequence of the user. For example, if the user selects first accompanying music at first and then selects second accompanying music, then the first accompanying music is arranged before the second accompanying music.

As another implementation mode, the detection unit 41 is further configured to acquire a third triggering operation.

The selection unit 43 is further configured to regulate the sequence of the at least two pieces of multimedia data in the first playing interface to generate a second playing interface based on the third triggering operation acquired by the detection unit 41.

The playing unit 44 is further configured to play the at least two pieces of multimedia data based on a playing sequence in the second playing interface generated by the selection unit 43.

In the implementation mode, the sequence of the at least two pieces of multimedia data in the first playing interface may be regulated through the third triggering operation detected by the detection unit 41. The third triggering operation is, for example, a dragging triggering operation. That is, an operation object is pressed and moved. A time point for regulation may be any time after the first playing interface is generated in the embodiment. Of course, in a playing process of the multimedia data, a regulation range is only limited to the multimedia data which has yet not been played, that is, a sequence of the multimedia data which has yet not been played in the first playing interface may be regulated in the embodiment. For example, the fifth piece of multimedia data in the first playing interface is regulated to be the second, thereby generating the second playing interface.

In the embodiment, when the playing unit 44 plays first multimedia data in the first playing interface, a first instruction is generated, and the first instruction is executed to turn on audio input device (i.e. a microphone) of the terminal device to acquire the audio data through the audio input device. In the embodiment, the first audio data acquired by the audio input device is the audio data acquired through the audio input device in the process of playing the first multimedia data. The first audio data includes audio data sung without accompanying music by the user, and of course, further includes any audio data acquired by the audio input device.

Furthermore, the first multimedia data and the first audio data may be synthesized in a preconfigured synthesis manner. The preconfigured synthesis manner may select any data synthesis manner in the conventional art, and will not be specifically limited in the embodiment.

In the embodiment, the synthesis unit 46 is configured to, at the end of playing of the first multimedia data, synthesize the first multimedia data and the first audio data as second multimedia data, or is configured to, when the detection unit 41 detects that a continuous playing instruction is input after the first multimedia data is started to be played and before multimedia data following the first multimedia data is started to be played, synthesize the first multimedia data and the first audio data as the second multimedia data.

In the embodiment, a first time period is preconfigured. After each piece of multimedia data is played, the played multimedia data and acquired audio data are synthesized in the first time period. That is, the next multimedia data is not played in the first time period, so that data synthesis time is reserved for the terminal device. When the first time period expires or after new multimedia data is synthesized, the next multimedia data is automatically played.

Specifically, the first multimedia data and the first audio data may be synthesized as first singing data within a first preset time length from the end of playing of the first multimedia data to the start of playing of the second multimedia data. Alternatively, when a continuous playing instruction input by the user after the first multimedia data is started to be played and before the second multimedia data is started to be played is detected, the first multimedia data and the first audio data are synthesized as the first singing data.

Those skilled in the art should know that functions of respective processing units in the terminal device according to the embodiment of the disclosure may be understood with reference to related descriptions for the method for processing information, and each processing unit in the terminal device according to the embodiment of the disclosure may be implemented by analogue circuits which realize the functions in the embodiment of the disclosure, and may also be implemented by running software which realizes the functions in the embodiment of the disclosure on an intelligent terminal.

In the embodiment, the terminal device may specifically be a mobile terminal such as an intelligent mobile phone, a wearable device and a tablet computer, and of course, may also be a fixed terminal such as a PC and an all-in-one computer. All of the detection unit 41, switching unit 42, selection unit 43 and synthesis unit 44 in the terminal device may be implemented by a Central Processing Unit (CPU), Digital Signal Processor (DSP) or Field-Programmable Gate Array (FPGA) in the terminal device in practice. The playing unit 44 in the terminal device may be implemented by a power amplifier in the terminal device in practice. The acquisition unit 45 may be implemented by a microphone in the terminal device in practice.

It is noted herein that the terminal device may be an electronic device such as a PC, may also be a portable electronic device such as a tablet computer, a laptop computer, a wearable device and an intelligent mobile terminal and is installed with the first application (i.e. a sing recording application) to realize the function of acquiring the second audio at the same time of outputting the first audio data (the accompanying audio data) and synthesizing the first audio data and the second audio data. The terminal device at least includes a memory configured to store data and a processor configured for data processing.

Herein, the processor configured for data processing may be implemented by means of a microprocessor, a CPU, a DSP or an FPGA. The memory includes control instructions, the control instructions may be computer-executable codes, and each step in the flow of the method for processing information according to the embodiment of the disclosure is implemented through the control instructions.

Figure 6:
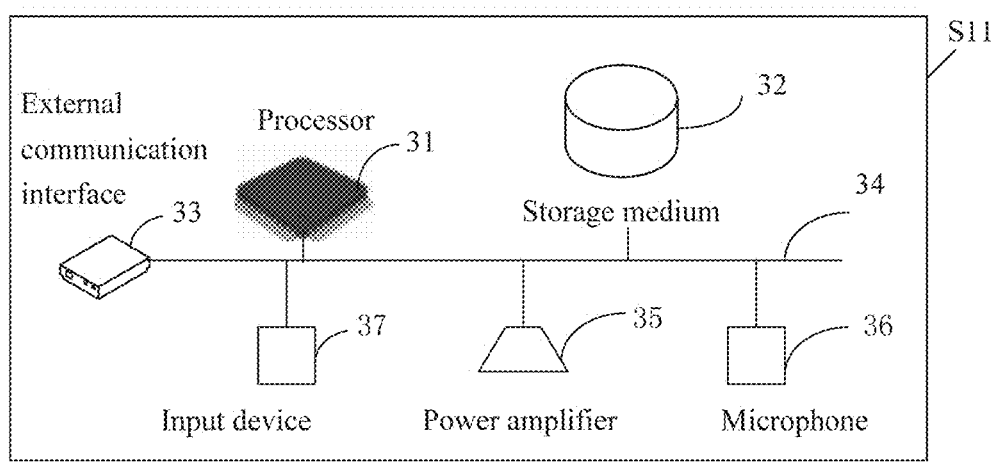
FIG. 6 is a schematic diagram of a hardware entity corresponding to a terminal device according to an embodiment of the disclosure.

FIG. 6 is a schematic diagram of a hardware entity corresponding to a terminal device according to an embodiment of the disclosure. An example of the terminal device serving as the hardware entity is shown in FIG. 6. The terminal device S11 includes a processor 31, a storage medium 32, a power amplifier 35, a microphone 36, an input device 37 and at least one external communication interface 33. All of the processor 31, the storage medium 32, the power amplifier 35, the microphone 36, the input device 37 and the external communication interface 33 are connected through a bus 34, and the bus 34 is configured to transmit data among the processor 31, the storage medium 32, the power amplifier 35, the microphone 36, the input device 37 and the external communication interface 33. Of course, the terminal device S11 further includes a display screen or a display which is not shown in FIG. 6.

Herein, the input device 37 is mainly configured to acquire an input operation of a user. When the terminal device is different, the input device 37 may also be different. For example, when the terminal device is a PC, the input device 37 may be an input device such as a mouse and a keyboard. When the terminal device is a portable device such as an intelligent mobile phone, a wearable device and a tablet computer, the input device 37 may be a touch screen.

Specifically, the user runs a first application pre-installed in the terminal device through the input device 37 of the terminal device. The processor 31 controls the display screen to display a display interface of the first application (referring to FIG. 4A). When the processor 31 detects that an operation point of the input device 37 is for a first button in the display interface of the first application, a first control instruction is generated, and switching to a preset mode (i.e. a continuous singing mode) is controlled according to the first control instruction. In the preset mode, the processor 31 selects at least two pieces of multimedia data based on an input operation of the input device 37 (referring to FIG. 4C or FIG. 4D), a first playing interface is generated for the selected at least two pieces of multimedia data, and the display screen is controlled to display the first playing interface (referring to FIG. 4E). When the input operation of the input device 37 is for a network data acquisition entry (referring to FIG. 4C or FIG. 4D), the processor 31 establishes a connection with a network server through the external communication interface 33, and acquires the selected multimedia data from the network server. When the processor 31 detects that the operation point of the input device 37 is for a second button in the first playing interface (referring to a "start to sing continuously" button shown in FIG. 4E), a second control instruction is generated, the power amplifier 35 is activated based on the second control instruction, the at least two pieces of multimedia data in the first playing interface are sequentially played through the power amplifier 35, and meanwhile, the microphone 36 is activated based on the second control instruction to acquire audio data through the microphone 36. After one piece of multimedia data is played, the processor 31 synthesizes the multimedia data and the acquired audio data, and stores synthesized multimedia data into the storage medium 32.

In some embodiments provided by the disclosure, it should be understood that the disclosed device and method may be implemented in another manner. The device embodiment described above is only schematic, and for example, division of the units is only logic function division, and other division manners may be adopted in practice. For example, multiple units or components may be combined or integrated into another system, or some characteristics may be ignored or not executed. In addition, coupling, or direct coupling or communication connection between displayed or discussed components may be indirect coupling or communication connection, implemented through some interfaces, of the device or the units, and may be electrical and mechanical or in other forms.

The abovementioned units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit. The abovementioned integrated unit may be implemented in a hardware form, and may also be implemented in form of hardware and software function unit.

Those skilled in the art should know that: all or part of the steps of the abovementioned method embodiment may be implemented by instructing related hardware through a program, the abovementioned program may be stored in a computer-readable storage medium, and the program is executed to execute the steps of the abovementioned method embodiment. The storage medium includes: various media capable of storing program codes such as mobile storage device, a Read-Only Memory (ROM), a Random Access Memory (RAM), a magnetic disk or an optical disk.

Alternatively, when being implemented in form of software function module and sold or used as an independent product, the integrated unit of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a piece of computer device (which may be a PC, a server, network device or the like) to execute all or part of the method in each embodiment of the disclosure. The abovementioned storage medium includes: various media capable of storing program codes such as mobile storage device, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

INDUSTRIAL APPLICABILITY

According to the embodiments of the disclosure, the continuous singing mode is added to implement selection of the at least two pieces of accompanying music at one time and continuous song recording accompanied with the at least two pieces of accompanying music at one time, so that the user is prevented from repeatedly executing operations of selection, playing and the like after completing recording a song. Therefore, on one hand, operations of the user are reduced, and operation experiences of the user are improved. On the other hand, a requirement of the user on continuous recording of multiple songs is also met, and user experiences are greatly improved.

The invention claimed is:

1. A method for processing information, comprising:
   acquiring a first control instruction, and switching a first application to a preset mode according to the first control instruction;
   acquiring a first triggering operation based on the preset mode, selecting at least two pieces of multimedia data based on the first triggering operation, and generating a first playing interface;
   when a second control instruction is acquired,
      sequentially and automatically playing the at least two pieces of multimedia data in the first playing interface; and
      in a process of sequentially and automatically playing the at least two pieces of multimedia data, continuously acquiring a plurality of audio data and synthesizing each of the at least two pieces of multimedia data and one of the plurality of audio data acquired at a same time of playing the each of the at least two pieces of multimedia data to thereby obtain one corresponding synthesized multimedia data.

2. The method according to claim 1, wherein the acquiring a first control instruction comprises: acquiring a second triggering operation, and generating the first control instruction based on the second triggering operation, wherein the second triggering operation is for a preset region in a display interface of the first application.

3. The method according to claim 1, wherein the selecting at least two pieces of multimedia data based on the first triggering operation and generating the first playing interface comprises:
   selecting multimedia data stored in at least one of a terminal device
   or a network device based on the first triggering operation; and
   generating the first playing interface comprising the at least two pieces of multimedia data for the selected at least two pieces of multimedia data.

4. The method according to claim 3, wherein the sequentially and automatically playing the at least two pieces of multimedia data in the first playing interface comprises:
   when the multimedia data is stored in the terminal device, directly playing the multimedia data; and when the multimedia data is stored in the network device, searching and downloading the multimedia data based on a storage address of the multimedia data, and playing the multimedia data after downloading.

5. The method according to claim 1, further comprising, after the acquiring a first triggering operation based on the preset mode, selecting at least two pieces of multimedia data based on the first triggering operation, and generating a first playing interface:
   acquiring a third triggering operation, and regulating a sequence of the at least two pieces of multimedia data in the first playing interface to generate a second playing interface based on the third triggering operation; and
   sequentially and automatically playing the at least two pieces of multimedia data based on a playing sequence in the second playing interface.

6. A terminal device, comprising: a detection unit, a switching unit, a selection unit, a playing unit, an acquisition unit, and a synthesis unit, wherein:
   the detection unit is configured to acquire a first control instruction, is also configured to acquire a first triggering operation based on a preset mode, and is further configured to acquire a second control instruction;
   the switching unit is configured to switch a first application to the preset mode according to the first control instruction detected by the detection unit;
   the selection unit is configured to select at least two pieces of multimedia data based on the first triggering operation acquired by the detection unit, and then to generate a first playing interface;
   the playing unit is configured, when the detection unit acquires the second control instruction, to sequentially and automatically play the at least two pieces of multimedia data in the first playing interface;
   the acquisition unit is configured, in a process that the playing unit sequentially and automatically plays the at least two pieces of multimedia data, to continuously acquire a plurality of audio data; and
   the synthesis unit is configured to synthesize each of the at least two pieces of multimedia data and one of the plurality of audio data acquired at a same time of playing the each of the at least two pieces of multimedia data to thereby obtain one corresponding synthesized multimedia data.

7. The terminal device according to claim 6, wherein the detection unit is configured to acquire a second triggering operation, and generate the first control instruction based on the second triggering operation, wherein the second triggering operation is for a preset region in a display interface of the first application.

8. The terminal device according to claim 6, wherein the selection unit is configured to select multimedia data stored in at least one of the terminal device or a network device based on the first triggering operation; and to generate the first playing interface comprising the at least two pieces of multimedia data for the selected at least two pieces of multimedia data.

9. The terminal device according to claim 8, wherein the playing unit is configured:
   when the multimedia data is stored in the terminal device, to directly play the multimedia data; and
   when the multimedia data is stored in the network device, to search and download the multimedia data based on a storage address of the multimedia data, and then to play the multimedia data after downloading.

10. The terminal device according to claim 6, wherein the detection unit is further configured to acquire a third triggering operation, wherein:
    the selection unit is further configured to regulate a sequence of the at least two pieces of multimedia data in the first playing interface to generate a second playing interface based on the third triggering operation acquired by the detection unit; and
    the playing unit is further configured to sequentially and automatically play the at least two pieces of multimedia data based on a playing sequence in the second playing interface generated by the selection unit.

11. A non-transitory computer-readable storage medium having computer-executable instructions stored therein, when executed by a processor of a terminal, cause the processor of the terminal to:
    acquire a first control instruction, and switch a first application to a preset mode according to the first control instruction;
    acquire a first triggering operation based on the preset mode, select at least two pieces of multimedia data based on the first triggering operation, and generate a first playing interface;
    when a second control instruction is acquired,
       sequentially and automatically play the at least two pieces of multimedia data in the first playing interface; and
       in a process of sequentially and automatically playing the at least two pieces of multimedia data, continuously acquire a plurality of audio data and synthesize each of the at least two pieces of multimedia data and one of the plurality of audio data acquired at a same time of playing the each of the at least two pieces of multimedia data to thereby obtain one corresponding synthesized multimedia data.

12. The method according to claim 1, wherein in the continuously acquiring a plurality of audio data and synthesizing each of the at least two pieces of multimedia data and one of the plurality of audio data acquired at a same time of playing the each of the at least two pieces of multimedia data to thereby obtain one corresponding synthesized multimedia data, the synthesizing is performed at an end of playing the each of the at least two pieces of multimedia data.

13. The method according to claim 1, wherein in the continuously acquiring a plurality of audio data and synthesizing each of the at least two pieces of multimedia data and one of the plurality of audio data acquired at a same time of playing the each of the at least two pieces of multimedia data to thereby obtain one corresponding synthesized multimedia data, the synthesizing is performed upon receiving a triggering instruction for playing multimedia data which is next to the each of the at least two pieces of multimedia data.

14. The method according to claim 1, wherein in the acquiring a first control instruction, and switching a first application to a preset mode according to the first control instruction:
    the first application supports a voice instruction control function; and
    the acquiring a first control instruction comprises: acquiring voice input information.

15. The method according to claim 1, wherein in the acquiring a first control instruction, and switching a first application to a preset mode according to the first control instruction:
    the acquiring a first control instruction comprises: acquiring a fourth triggering operation which corresponds to an operation gesture.

16. The terminal device according to claim 6, wherein the synthesis unit is configured to synthesize each of the at least two pieces of multimedia data and one of the plurality of audio data acquired at a same time of playing the each of the at least two pieces of multimedia data to thereby obtain one corresponding synthesized multimedia data at an end of playing the each of the at least two pieces of multimedia data.

17. The terminal device according to claim 6, wherein the synthesis unit is configured to synthesize each of the at least two pieces of multimedia data and one of the plurality of audio data acquired at a same time of playing the each of the at least two pieces of multimedia data to thereby obtain one corresponding synthesized multimedia data upon receiving a triggering instruction for playing multimedia data which is next to the each of the at least two pieces of multimedia data.

18. The terminal device according to claim 6, wherein the detection unit is configured to acquire voice input information to thereby acquire the first control instruction.

19. The terminal device according to claim 6, wherein the detection unit is configured to acquire a fourth triggering operation corresponding to an operation gesture to thereby acquire the first control instruction.

\* \* \* \* \*